US007480934B2

(12) United States Patent
Chan et al.

(10) Patent No.: US 7,480,934 B2
(45) Date of Patent: Jan. 20, 2009

(54) MULTIPLE IDENTITY MANAGEMENT IN AN ELECTRONIC COMMERCE SITE

(75) Inventors: Victor S. Chan, Thornhill (CA); Darshanand Khusial, Mississauga (CA); Lev Mirlas, Thornhill (CA)

(73) Assignee: International Business Machines Corporation, Armonk, NY (US)

( * ) Notice: Subject to any disclaimer, the term of this patent is extended or adjusted under 35 U.S.C. 154(b) by 724 days.

(21) Appl. No.: 10/727,322

(22) Filed: Dec. 3, 2003

(65) Prior Publication Data

US 2004/0260651 A1 Dec. 23, 2004

(30) Foreign Application Priority Data

Jun. 17, 2003 (CA) .................................. 2432483

(51) Int. Cl.
*G06F 17/30* (2006.01)
(52) U.S. Cl. .................... 726/8; 726/5; 726/6; 713/182; 709/204; 709/225
(58) Field of Classification Search ...................... 726/6, 726/8, 9; 705/50; 713/155, 182, 180, 183; 709/204, 227, 250
See application file for complete search history.

(56) References Cited

U.S. PATENT DOCUMENTS 5,604,490 A * 2/1997 Blakley et al. .................. 726/5

(Continued)

FOREIGN PATENT DOCUMENTS

JP 2001249984 9/2001

(Continued)

OTHER PUBLICATIONS

Kemper Littman, M.; "Emerging Web-based Applications: An Examination of Electronic Commerce",ISTE, Oct.-Dec. 1999, vol. 11, No. 1.

(Continued)

*Primary Examiner*—Nasser G Moazzami
*Assistant Examiner*—Shanto M Abedin
(74) *Attorney, Agent, or Firm*—Francis Lammes; Stephen J. Walder, Jr.; Jeffrey S. LaBaw

(57) ABSTRACT

In electronic commerce (e-commerce) sites that are executed on a single e-commerce application, a user's session is only associated with a single user identity for e-commerce site domain. Acting under a single identity across the site may not be desired. There may be requirements to associate an individual user with one or more separate identities within parts of the site. Aspects of the invention provide a method, system and computer program product for managing multiple user identities for a user of an electronic commerce (e-commerce) site. The method comprises defining the e-commerce site as one or more security domains; and in response to a user's request to invoke an operation of the e-commerce site: determining a one of the one or more security domains to which the operation relates; performing one of a) creating a session and b) reusing a session for the user automatically in accordance with the determined security domain, said session associated with a user identity and a role indicating privileges for invoking operations of the e-commerce site in at least the determined security domain; and persisting said session for reuse. The user's request may be received in association with one or more sessions persisted for the user and a one of the sessions selected in accordance with the determined security domain. In response, either a session may be created or reused. Persisting may comprise providing one or more cookies defining the session to the user for associating with a subsequent request. In accordance with a feature of this aspect, the e-commerce site may define each of the one or more security domains as a hierarchy of organizations and assets owned by the organizations and the determining a one of the one or more security domains to which the operation relates may comprise evaluating the user's request in accordance with the hierarchy.

9 Claims, 7 Drawing Sheets

U.S. PATENT DOCUMENTS

| | | | |
|---|---|---|---|
| 6,609,198 B1 * | 8/2003 | Wood et al. | 713/155 |
| 6,668,322 B1 * | 12/2003 | Wood et al. | 713/182 |
| 6,993,596 B2 * | 1/2006 | Hinton et al. | 709/250 |
| 6,996,605 B2 * | 2/2006 | Low et al. | 709/204 |
| 7,137,006 B1 * | 11/2006 | Grandcolas et al. | 713/180 |
| 7,185,364 B2 * | 2/2007 | Knouse et al. | 726/8 |
| 7,194,764 B2 * | 3/2007 | Martherus et al. | 726/8 |
| 7,325,058 B1 * | 1/2008 | Sheth et al. | 709/225 |
| 2002/0055888 A1 | 5/2002 | Beran et al. | |
| 2002/0073151 A1 * | 6/2002 | Rogers et al. | 709/204 |
| 2002/0103801 A1 | 8/2002 | Lyons | |
| 2002/0112083 A1 * | 8/2002 | Joshi et al. | 709/248 |
| 2003/0005118 A1 * | 1/2003 | Williams | 709/225 |
| 2003/0084165 A1 * | 5/2003 | Kjellberg et al. | 709/227 |
| 2003/0115267 A1 * | 6/2003 | Hinton et al. | 709/204 |
| 2004/0128390 A1 * | 7/2004 | Blakley et al. | 709/228 |

FOREIGN PATENT DOCUMENTS

| | | |
|---|---|---|
| WO | WO0049546 | 8/2000 |
| WO | WO 01/09792 A2 | 2/2001 |
| WO | WO 01/11452 A2 | 2/2001 |
| WO | WO0205476 | 1/2002 |

OTHER PUBLICATIONS

Rejman-Green, M.; "Biometrics -Real Identities for a Virtual World", 2002, pp. 229-242.

Schier, K. et al; "The Global Information Society and Electronic Commerce: Privacy Threats and Privacy Technologies", Aug. 25-28, 1998.

Lawton, G.; "Is Technology Meeting the Privacy Challenge?", Technology News, Sep. 2001.

Shaw, T.; "Exploring the Role of Identification in the Privacy Decisions of Webmasters".

Arlitt, M.; "Characterizing the Scalability of a Large Web-Based Shopping System", Aug. 2001, ACM Transactions On Internet Technology, vol. 1, No. 1.

Shulman, A., et al; "The US/Mexico Border Crossing Card (BCC): A Case Study in Biometric, Machine-Readable ID", Mar. 30, 2002.

* cited by examiner

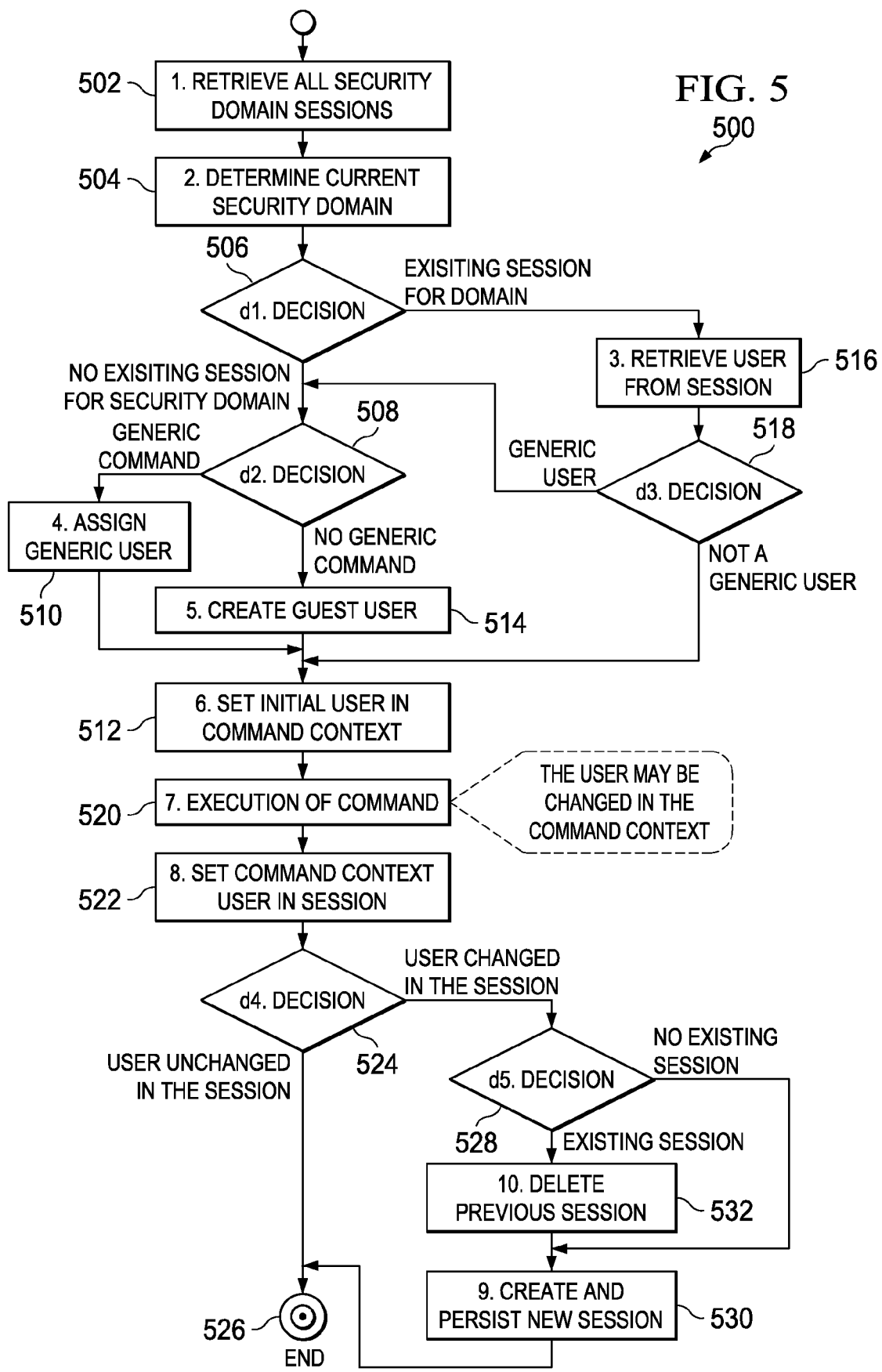

MULTIPLE IDENTITY MANAGEMENT IN AN ELECTRONIC COMMERCE SITE

FIELD OF THE INVENTION

The present invention relates to application operation and development, more particularly, to managing multiple identities for a user of an electronic commerce site.

BACKGROUND OF THE INVENTION

Electronic commerce (e-commerce) relates to the electronic performance of transactions for goods or services. One component of e-commerce application operation is security, particularly user security. Security enables a user of the e-commerce application to be authenticated and provided permission to invoke certain functions of the e-commerce application while preventing certain functions from invocation by users who cannot be authenticated or who do not have a required permission. One aspect of user security is identity management which distinguishes individual users and associates an individual user's identity with the user's requests and activities during an e-commerce session.

E-commerce applications are typically made available to users via a network such as the Internet at an Internet site or domain defined by one or more universal resource locators (URLs). Pages identified by URLs for the site may be browsed by a user with a client browsing application (web browser) that requests the pages from one or more servers hosting the site. E-commerce functions may be invoked by the user to initiate and conclude e-commerce transactions via the web browser.

Browsing purely in accordance with the hyper text transfer protocol (HTTP) of the Internet is stateless: a previous user request to a site has no bearing on a current user request to the site. To maintain a state between an HTTP client and a server, a piece of data known as a cookie is used. The cookie is issued by the server to the client. To identify itself to the server on a subsequent request, the client browsing application submits the cookie as part of a subsequent request header. From information in the cookie the server can identify the client, thus maintaining a state across requests.

Cookies are a popular means of managing user sessions in e-commerce sites. When a user visits a site or authenticates to a site, a cookie is issued to the user to identify the user to the site for the life of the user's session (e.g. until the user closes the web browser or invokes a logoff function on the site).

Within an Internet domain, one or more security domains may be defined using a collection of related URLs and a user may be assigned the same privileges throughout a particular security domain. For the Internet domain shop.ibm.com, the following is an example of two security domains, one for each of store A and store B and where ... represents any string of characters like a wildcard placeholder:

i) URLs matching the pattern http://shop.ibm.com/...?...&storeId=A&...

ii) URLs matching the pattern http://shop.ibm.com/...?...&storeId=B&...

One or more security domains may be used to define an e-commerce shopping mall, e-commerce hosting site, e-commerce marketplace, or other place where online business is conducted. The aggregation of all the security domains in an e-commerce site is called the composite security domain.

In e-commerce sites that are executed on a single e-commerce application, a user's session is only associated with a single user identity for the composite security domain. Acting under a single identity across security domains may not be desired. There may be requirements to associate an individual user with one or more separate identities within each security domain or subset of security domains that form a composite domain. For example, if a user is browsing two independent stores at an Internet site and has added items to the user's shopping cart in both stores, it may be desired that the business logic of the e-commerce application only displays the shopping cart associated with the one store that the user is currently browsing. If the user wants to be treated under a common identity in two hosted stores but a different identity under a third store, the business logic to achieve this result is very complicated.

Gathering statistics of user activities at a particular store is much easier to perform with user identities that are only associated with the particular store than with user identities that are associated with multiple hosted stores. Merchants choosing to have their store in a hosted shopping mall often do so for reasons of affordability, sharing processing resources with other merchants to reduce costs. One consequence is that these merchants share their user's customer accounts among all the stores in the shopping mall. If a hosted store desires to move to its own e-commerce site, migration of customer accounts, including individual shopping carts and orders, may be very difficult or costly if the accounts and carts are shared with other stores.

As such, an identity management architecture which addresses some or all of these shortcomings is desired.

SUMMARY OF THE INVENTION

In one illustrative embodiment, a method is provided for managing multiple user identities for a user of an electronic commerce (e-commerce) site. The illustrative embodiment defines the e-commerce site as a plurality of security domains. In response to a user's request to invoke an operation of the e-commerce site, the illustrative embodiment identifies a type of user identity being used by the user. In the illustrative embodiment, types of user identities comprise guest identity, a generic identity, and a registered identity. In the illustrative embodiment, the generic identity is a single user identity shared throughout a security domain. In the illustrative embodiment, the guest identity is an unique temporary user identity assigned to a user for the life of the users session within the security domain. In the illustrative embodiment, the registered identity is an unique identity that is reusable across sessions within the security domain. The illustrative embodiment determines if the type of user identity is appropriate to invoke the operation. Responsive to the type of user identity being an inappropriate type of user identity to invoke the operation, the illustrative embodiment switches the user to the appropriate type of user identity to invoke the operation. Responsive to the type of user identity being appropriate to invoke the operation, the illustrative embodiment determines a security domain of the plurality of security domains to which the operation relates. The illustrative embodiment selects a session from a plurality of sessions persisted for the user based on the determined security domain. The illustrative embodiment reuses the selected session for the user automatically in accordance with the determined security domain, the selected session being associated with a user identity and a role, the user identity and the role together indicating privileges for invoking operations of the e-commerce site in the determined security domain.

These and other features and advantages of the present invention will be described in, or will become apparent to those of ordinary skill in the art in view of, the following detailed description of the illustrative embodiments of the present invention.

BRIEF DESCRIPTION OF THE DRAWINGS

In the figures which illustrate an example embodiment of this invention:

FIG. 5 illustrates in flowchart form operations of an aspect of the invention shown in FIG. 2.

DETAILED DESCRIPTION

The following detailed description of one or more embodiments of the present invention does not limit the implementation of the invention to any particular computer programming language. The present invention may be implemented in any computer programming language provided that the OS (Operating System) provides the facilities that may support the requirements of the present invention. A preferred embodiment is implemented in the Java computer programming language (or other computer programming languages in conjunction with Java). Any limitations presented would be a result of a particular type of operating system or computer programming language and would not be a limitation of the present invention.

In accordance with the present invention, there is provided a technique for managing multiple identities for a user in an e-commerce site. As previously noted, one or more security domains may be used to define virtual places where online business is conducted, examples of which are depicted in FIGS. 1A, 1B, 1C and 1D (FIGS. 1A-1D). FIGS. 1A-1D depict an exemplary e-commerce shopping mall site, e-commerce hosted stores site, e-commerce multiple go to market site and e-commerce marketplace site, respectively. Though not illustrated, in accordance with an aspect of the invention, each of the sites is implemented by a networked computer system including a server having one or more CPUs and a memory configured with computer instructions (i.e. applications and data) in accordance with a further aspect of the invention as described herein below. Throughout the description herein, an embodiment of the invention is discussed with aspects of the invention embodied on a sole computing device. As will be appreciated by those of ordinary skill in the art, aspects of the invention may be distributed amongst one or more networked computing devices which interact via one or more data networks such as, for example, the Internet. However, for ease of understanding, aspects of the invention have been embodied in a single computing device.

Figure 2:
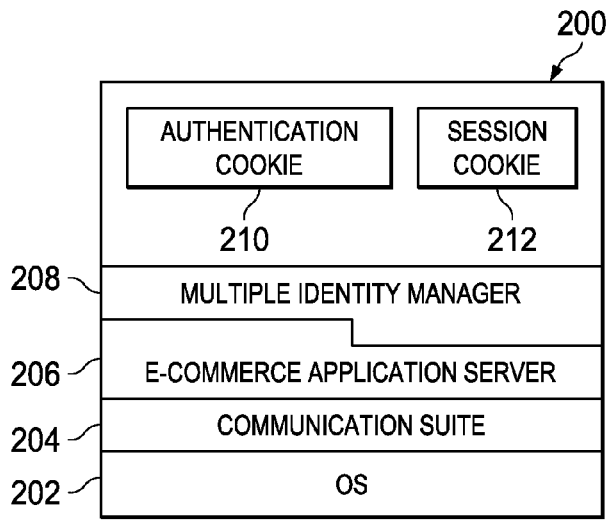
FIG. 2 schematically illustrates a portion of a computer system, namely a memory, embodying aspects of the present invention.

The computer instructions/applications stored in the memory and executed by the CPU (thus adapting the operation of the computer system as described herein) are illustrated in functional block form in FIG. 2. As will be appreciated by those of ordinary skill in the art, the delineation between aspects of the applications illustrated as functional blocks in FIG. 2 is somewhat arbitrary as the various operations attributed to a particular application as described herein may, in alternative embodiments, be subsumed by another application.

FIG. 2 illustrates the memory configured in accordance with the present invention for providing an e-commerce site, such as those of FIGS. 1A-1D, including a manager for managing multiple identities for a user of the site. Briefly, FIG. 2 illustrates memory 200, which may comprise one or more of both volatile and persistent memory for the storage of: operational instructions for execution by the CPU, data registers, application storage and the like. Memory 200 preferably includes a combination of random access memory (RAM), read only memory (ROM) and persistent memory such as that provided by a hard disk drive (all not shown). As illustrated, for exemplary purposes only, memory 200 stores OS 202, communications suite 204, e-commerce application server (EAS) 206 adapted with multiple identity manager (manager) 208 and a plurality of cookies 210, 212 for assigning a user identity and role to a user visiting a security domain defined by EAS 206 as discussed further herein below.

OS 202 is an operating system suitable for operation with the CPU of the computer system and the operations described herein. Multitasking, multithreaded OSes such as, for example, IBM AIX™, Microsoft Windows NT™ (NT is a bit dated it is better to use Microsoft Windows 2000), Linux or the like, are expected in many embodiments to be preferred. Communication suite 204 provides, through, interaction with OS 202 and a network interface (not shown) of the computer system, suitable communication protocols to enable communication with other networked computing devices via a network (also not shown) such as the Internet. Communication suite 204 may include one or more of such protocols such as TCP/IP, Ethernet, token ring and the like.

Also stored in memory 200 and incorporating aspects of the present invention is EAS 206 adapted by manager 208. In the exemplary embodiment, EAS 206 provides substantially all of the functionality needed to establish the e-commerce site including each electronic store and to carry out buying and selling over the Internet. This includes storing product catalog information provided by sellers or distributors, accepting requests for information from prospective user purchasers, and accepting and processing orders. The electronic store typically includes a collection of Web pages which describe a sellers' product offerings and which include on-line forms allowing users to place orders as is known to those skilled in the art. As earlier stated, though EAS 206 is shown stored in memory 200 of a single computer system, it is understood to persons skilled in the art that components of EAS 206 may be stored on additional computer systems networked with the computer system having memory 200.

Unlike conventional EASs, EAS 206 is adapted to have a multiple identity management capability via a manager 208. That is, EAS 206 is adapted to provide e-commerce operations to a user in association with multiple identities managed by manager 208 for one or more security domains defined for the e-commerce site of EAS 206.

Figure 1A:
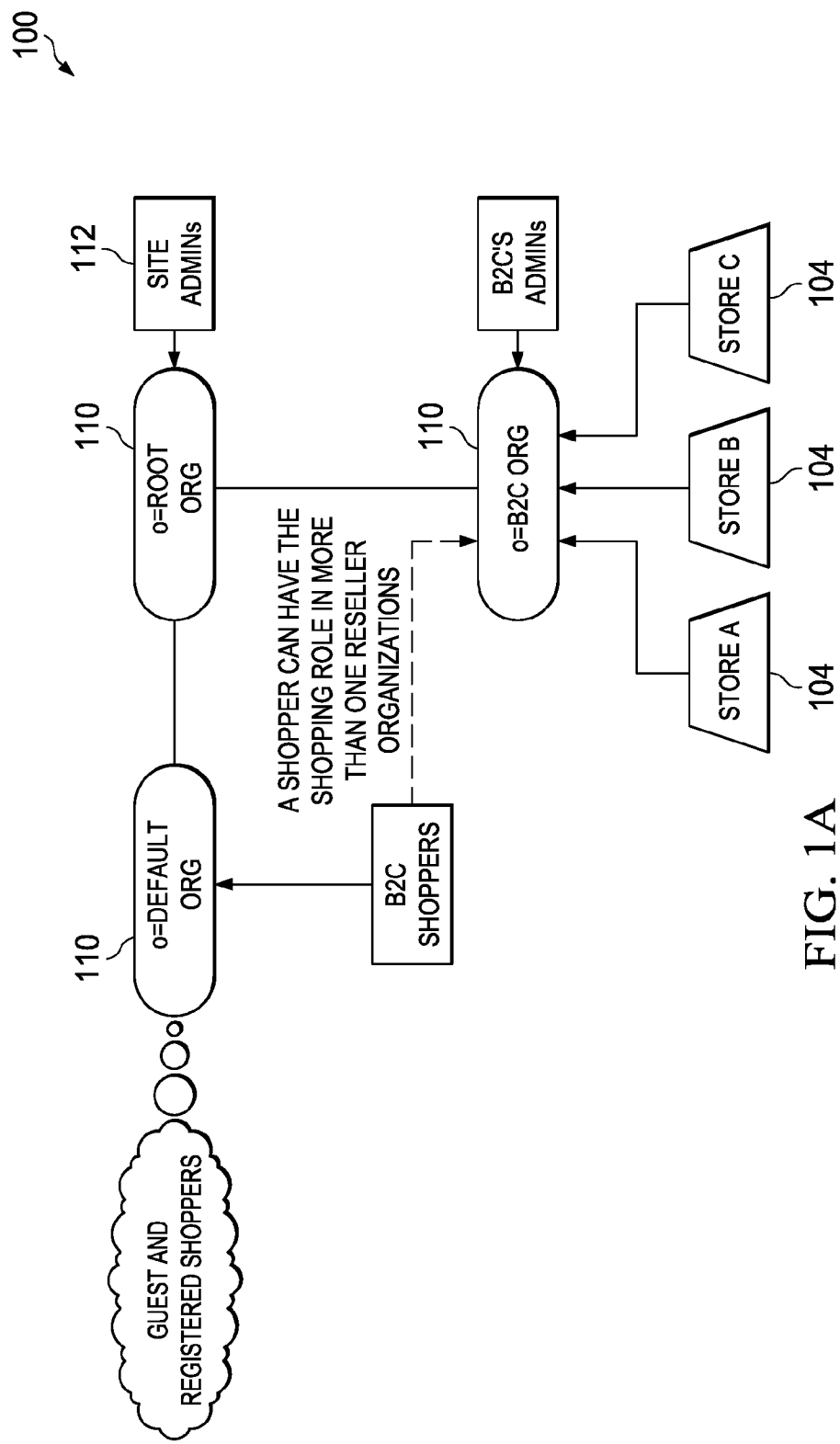
FIGS. 1A, 1B, 1C and 1D schematically illustrate respective exemplary e-commerce market models, namely, a shopping mall site, a hosted store site, a multiple go to market site and a marketplace site, embodying aspects of the invention.

FIG. 1A illustrates an exemplary e-commerce shopping mall site 100 defined by an e-commerce application such as EAS 206 comprising a plurality of stores on one site where users can shop. Typically, users are recognized by e-commerce application 204 adapted by multiple identity manager 208 and given the same privileges for all the stores in the mall 100. Thus the mall 100 has one security domain. Organizations 110 (depicted as ovals), may own or otherwise control other organizations 110, users 112 (depicted as cubes) and/or stores 104 (depicted as pyramids). Stores 104 comprise a set of related URLs and may be assigned a store identifier (ID), that is represented in the URL by the parameter storeId. Thus the set of URLs that belong to a store 104 for a particular Internet domain matches the pattern http://<Internet domain name>/...?...& storeId=x&..., where x is the ID of the store 104. In this mall 100 all the stores 104 form one security domain. Thus from the depiction in FIG. 1A, if the mall 100 is hosted on the site "shop.ibm.com", then the three URL patterns http://shop.ibm.com/...?...&storeId=A&..., http://shop.ibm.com/...?...&storeId=B&..., and http://shop.ibm.com/...?...&storeId=C&... form one security domain.

Figure 1B:
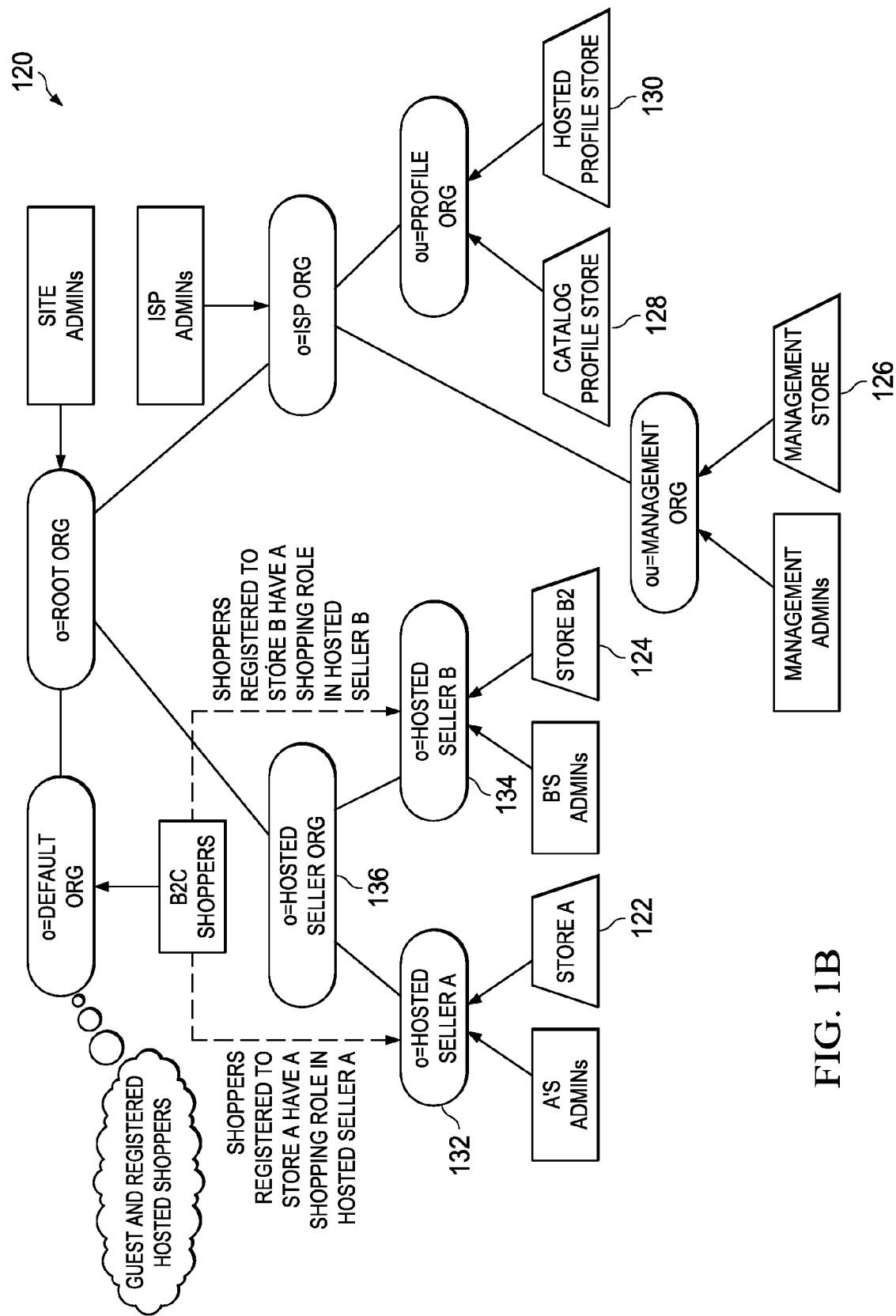

Typically, e-commerce sites can cost many millions of dollars to setup and maintain. Merchants who cannot afford their own online store or those who chose otherwise have the alternative of using a hosted store site that hosts multiple independent stores. An alternative exemplary e-commerce site, namely an e-commerce hosted store site 120, shown in FIG. 1B, comprises a plurality of stores 122, 124, 126, 128 and 130 executing within a single e-commerce application such as EAS 206. FIG. 1B depicts each hosted store 122 and 124 being owned by its own respective hosted organization 132 and 134. All hosted organizations 132 and 134 are in turn owned by the Hosted Seller Org 136. For the creation and management of the hosted organization and its hosted store the management store (Mngt Store) 126 is used.

Running the hosted site 120 in a single e-commerce application 206 is desirable as it has a number of advantages:

i) Running many small stores in a single application is more likely to make efficient use of processor time than a single small store.

ii) Stores can share common resources such as web pages and product catalogs.

iii) Maintenance costs for many stores in a single application are much less than having one store per application.

In FIG. 1B, store A 122 and store B 124 each have their own security domain. The Mngt store 126 also has its own security domain.

Figure 1C:
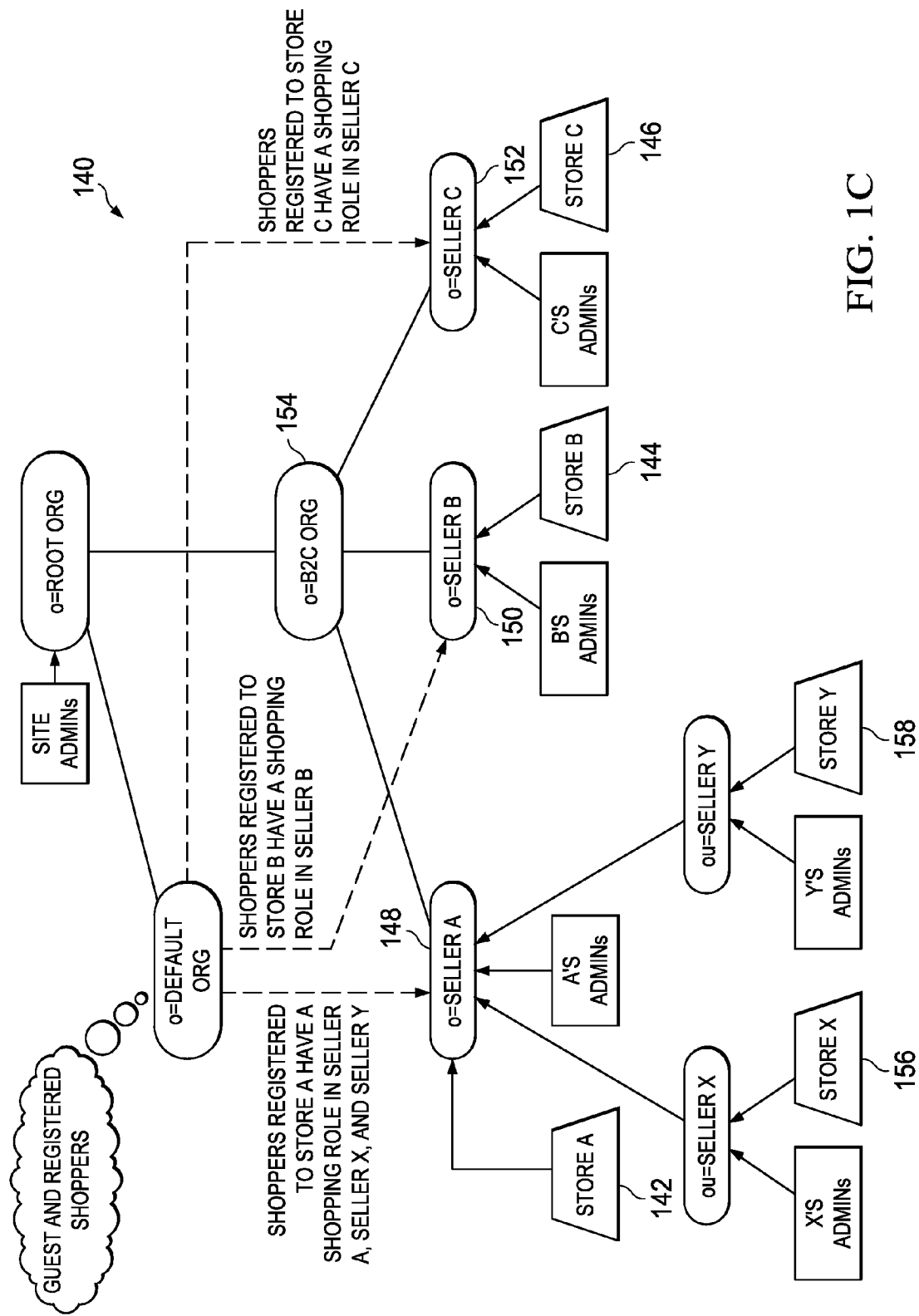

FIG. 1C illustrates a further alternative site configuration, namely an exemplary e-commerce multiple go to market site 140 executing in a single e-commerce application such as EAS 206. Each independent seller (e.g. A, B and C) has its own store 142, 144, and 146 and top-level organization 148, 150 and 152, (i.e. SellerA, SellerB, and SellerC). These seller organizations 148, 150 and 152 are owned by a common parent organization 154, namely, B2C Org. This site configuration 140 is very similar to the hosted store site 120 of FIG. 1B. However, that e-commerce site model 120 is extended in this configuration 140 as a single seller (e.g. A) is able to sell customized products in various specialty stores 156 and 158. For example, a seller may have a general purpose store, a store targeting infant needs, a store targeting women's apparel, a store targeting bargain hunters, etc. These specialty stores are each be owned by a separate organization which in turn is owned by one of the top-level seller organizations. SellerA 148 in FIG. 1C is an example of such a top-level seller organization. In this example, store A 142 is the general purpose store, while store X 156 and store Y 158 are specialty stores, targeting niche markets.

In a multiple go to market model such as exemplary configuration 140, a specialty store constitutes its own security domain. For example, a shopper who registers to store X 156 is not granted any privileges in store A 142 or store Y 158. However, a top-level organization and its sub-organizations can together form a security domain when privileges are assigned at the top-level organization level. For example, a shopper who registers to store A 142 is granted privileges in stores A, X and Y (142, 156 and 158).

Figure 1D:
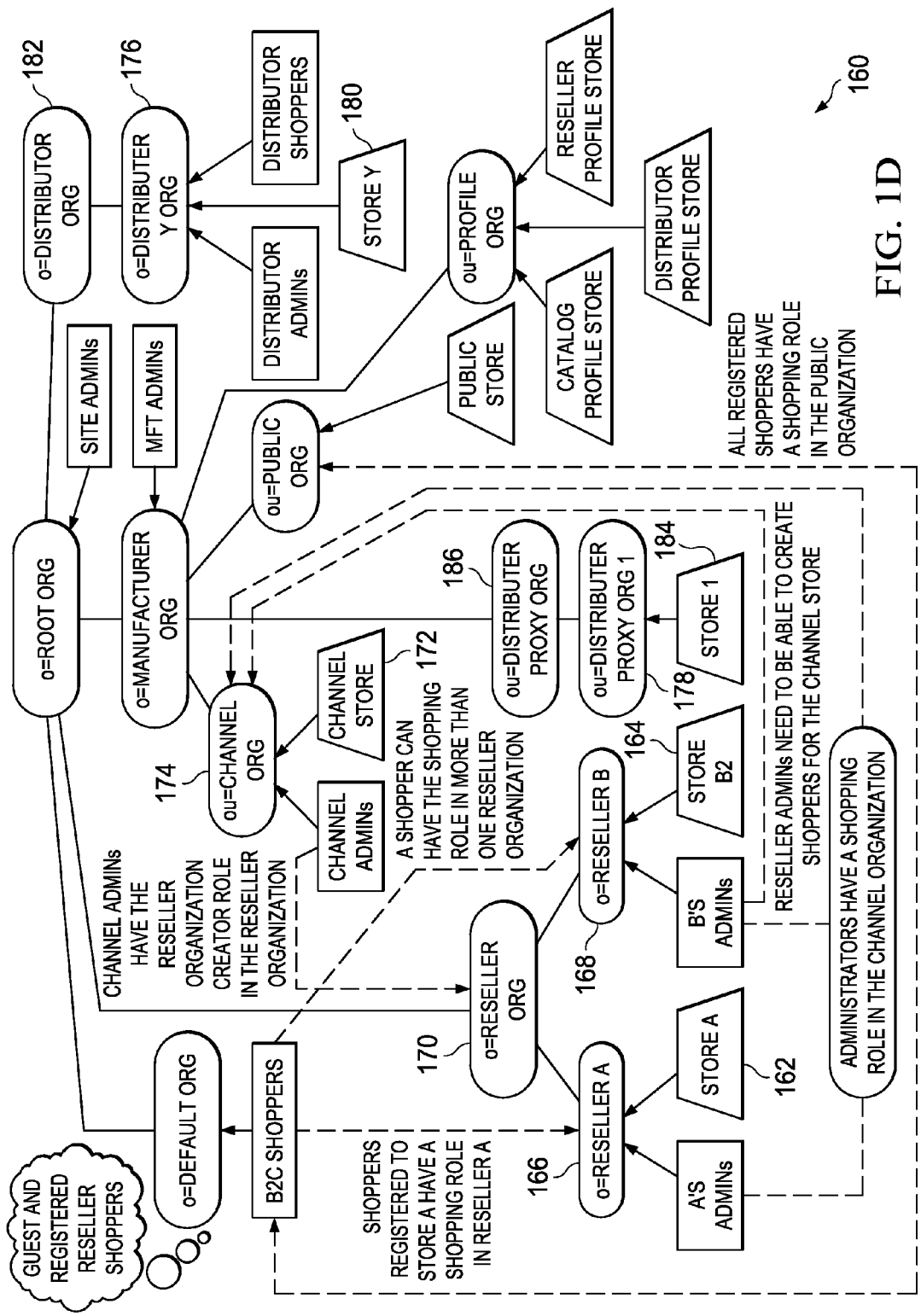

FIG. 1D illustrates another exemplary e-commerce site, namely e-commerce marketplace site 160 executing in a single e-commerce application 206, such as EAS 206 where resellers offer their items for sale in independent stores to the general public. However, unlike the hosted store site 120 of FIG. 1B, in this model 160 resellers purchase products from various distributors via a marketplace store. The distributors only sell their goods to resellers and not to the general public.

Each reseller (e.g. A and B) has their own store 162 and 164 and organization 166 and 168. The reseller organizations 166 and 168 are owned by a top level organization 170, namely, Reseller Org. The marketplace store, referenced as channel store 172 is owned by the organization, Channel Org 174. There are two types of distributors depicted in the model. These are hosted distributors 176 and proxy distributors 178. Hosted distributors 178 have their stores (e.g. 180) hosted on the site 160 and under the organization Distributor Org 182. Proxy distributors 178 have an independent site (not shown) but use a proxy store (e.g. 184) under a proxy organization 186 to bridge the connection between the resellers and the independent distributor stores.

There are many security domains illustrated in FIG. 1D. Each reseller store (162, 164) has its own security domain. Channel store 172 is another security domain. All the distributor proxy organizations 186 form a security domain. And finally, all distributor organizations 182 define a further independent security domain.

In accordance with the invention, manager 208 assigns one of three types of privileges to users within a security domain. These are guest, registered, and administrative. Guest privileges are assigned to users who have a temporary relationship with the security domain. Registered privileges are assigned to users who have a permanent relationship with the security domain but do not have any administrative privileges within that domain. Administrative privileges are assigned to users who have a permanent relationship with the security domain and have the ability to perform administrative management operations within the domain. As users navigate the e-commerce site and request particular operations, manager 208 may assign different or additional types of privileges as described further below.

Typically, users with guest privileges can perform a limited set of operations in a security domain, e.g. browsing the catalog, placing an isolated order, etc. If a user intends to do various e-commerce transactions in a store over a period of time, there may be a benefit to having a permanent relationship with the security domain by obtaining registration privileges. In this way, the user can later authenticate to the security domain and view his order history, address book, etc. Security domains may be configured to only allow users with registered privileges to access the store's assets, e.g. catalog, address book, etc. Users with administrative privileges can perform management operations such as resetting a the password of a user within the security domain.

Access control roles are used to distinguish the type of privileges a user has within a security domain. A user with guest privileges has no access control role within the security domain. A user with registered privileges has a single access control role within the domain known as the Registered Customer role. Users with administrative privileges may have one or more administrative roles within a security domain.

FIGS. 1A-1D each depict a tree-like hierarchy of organizations, stores and users where users and stores may only be leaf nodes of the tree. As depicted in FIGS. 1A-1D, organizations are used to group stores. Organizations only have one owner, known as their parent organization, but may own many organizations, known as the descendant organizations.

Organizations own assets. One such asset is a store. Each store is owned by a single organization, however an organization may own multiple stores. Stores do not own other stores.

Access control roles are associated with organizations. A user that plays a particular role in an organization, also plays the role in any of that organization's descendant organizations and assets. A user assigned a role for a particular organization grants to the user rights to a subset of URLs associated with the organization's stores.

Organizations are used to define the scope of a security domain. Since organizations are hierarchical in nature, the security domain can be defined as encompassing an organization and its descendants. Thus a user is granted the same set of privileges for assets owned by an organization and all its descendants.

To support multiple identities in a composite security domain, a person may be assigned one user ID per security domain or subset of security domains. There are three types of user IDs within a security domain. These are generic, guest, and registered. The generic type is a single user ID shared throughout the security domain. The main purpose for this type of user ID is performance and scalability. The guest type is an unique temporary user ID assigned to a user for the life of the user's session within a security domain. The registered type is an unique identity that is reusable across sessions within a security domain. A user ID that is of the registered type for a particular security domain must have an access control role within the security domain. A registered type user ID may be shared across security domains, by having an access control role in each domain. However, a generic ID or guest user ID cannot be shared across domains.

When a user invokes an operation in a security domain, a determination is made as to whether the type of the current user ID to perform the operation is appropriate. This does not necessarily mean that the user ID has the required privileges to perform the operation. If the operation being invoked will not result in a resource being associated with the user, for example, displaying a product page, then a generic, guest, or registered identity is sufficient. If the operation will result in a resource being associated with a user, then the guest or registered identity is sufficient. An operation such as adding an item to a shopping cart will result in a item resource being associated with the identity. If the operation requires the user to have a permanent relationship with the security domain, then the user ID must be of the registered type.

Figure 3:
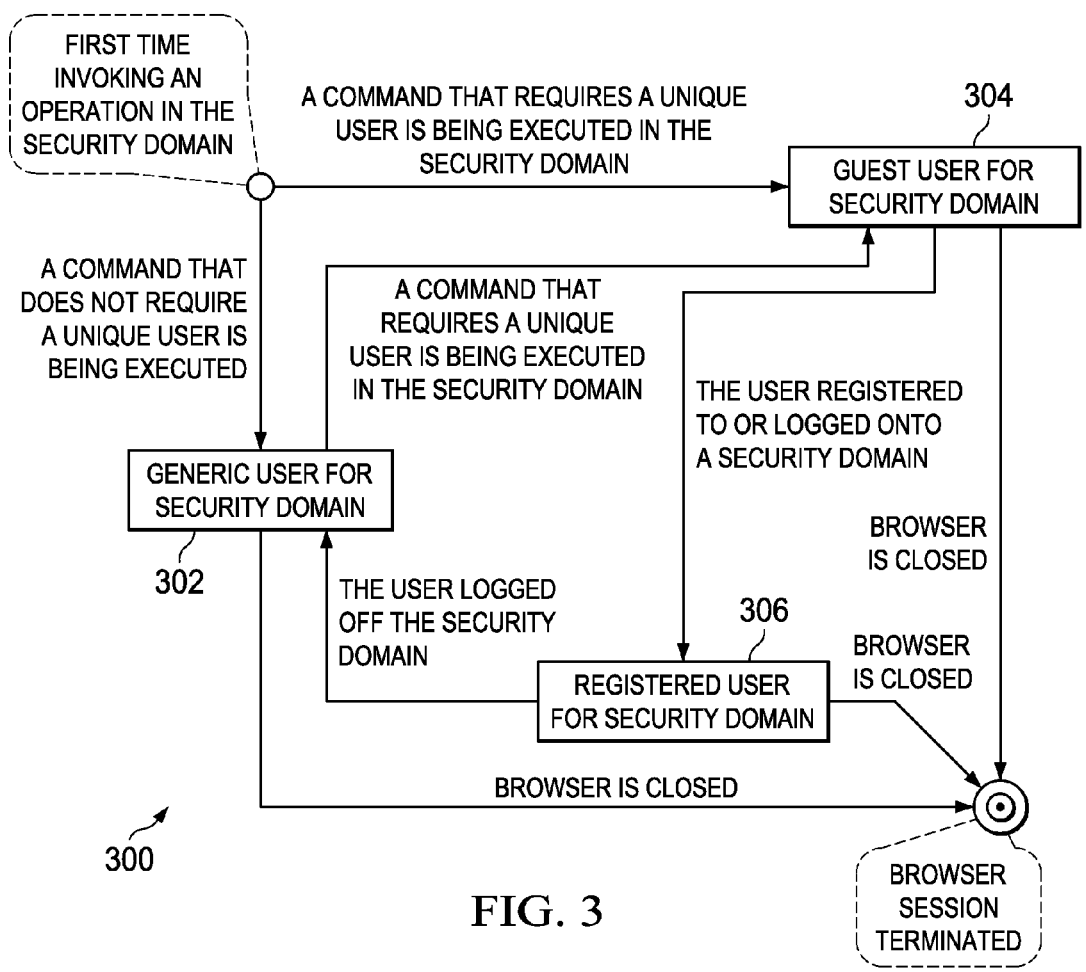
FIG. 3 illustrates a state diagram modeling an aspect of the present invention shown in FIG. 2.

If the type of user ID is not sufficient for invoking an operation within a security domain the user ID type may be switched to a more appropriate type. Manager 208 maintains user types for a particular user, as the user navigates the e-commerce site and requests operations via commands. FIG. 3 is a state diagram that illustrates states and transitions 300 for maintaining user types within a security domain as performed by manager 208

Operation of manager 208 may be understood with reference to an exemplary shopping session by a user at a store such as store A 122 of FIG. 1B. Store A 122 corresponds to a security domain. A typical shopping scenario and the corresponding state transition is outlined below as may be further understood with reference to FIG. 3:

1) A user opens a client browser and accesses the store front page of the e-commerce site 120 sending an HTTP request to invoke a command on EAS 206. In response, manager 208 assigns the user (i.e. the client browser) the generic user identity (State 302).
2) A product display page of site 140 is accessed via a command through the client browser and an item is selected for placement in a shopping cart as a potential product to purchase. The command requires an user identity type other than generic. Thus manager 208 creates a unique guest user identity and assigns it to the client browser, transitioning to state 304.
3) The user registers to store A 122 via a command. Manager 208 creates and assigns a unique registered user identity to the client browser, transitioning to state 306.
4) When the user logoffs store A 122, manager 208 transitions to state 302 and assigns a generic user identity to the browser.
5) When the user closes its client browser, the cookies are cleared from the client browser memory.

In the exemplary embodiment of the invention, cookies are used to manage the various user IDs when a user invokes operations on a security domain. Two cookies are used for each user ID: an authentication cookie and a session cookie.

Authentication Cookie

The authentication cookie is used to authenticate the user on every request to the security domain. In the exemplary embodiment, the authentication cookie comprises two parts:

i) A user ID associated with the client browser (i.e. user) for the particular security domain. Each authentication cookie has a unique user ID.
ii) A one-way hash of the user ID, a timestamp unique to this user ID and an encryption key unique to the composite security domain. The timestamp associated with the user ID is persisted by manager 208, for example using memory 200, for subsequent confirmations of the user as a security and integrity measure.

Manager 208 verifies the authentication cookie on every request made by the client. Manager 208 first strips the security ID from the cookie value and constructs a one-way hash using the same algorithm described above. The new constructed hash string is compared to that in the cookie value, only if they match is the cookie considered valid.

User Session Cookie

The user session cookie contains session information for a particular security domain. For every authentication cookie there is an equivalent user session cookie. The user session cookie comprises four parts:

i) The user ID associated with this session.
ii) User preferences such as language and currency.
iii) A list of store IDs that this user is authorized to access. Associated with each storeID is a list of the user preference information for this store.
iv) A signature for this cookie such as a one-way hash of the above three parts (will be referred to as the value part) plus an encryption key unique to the site.

Table 1, below illustrates the format of the authentication and user session cookies.

TABLE 1

Example of the authentication and user session cookie pairs.

| Authentication Cookie Name | Authentication Cookie Value* | User Session Cookie Name | User Session Cookie Value* |
|---|---|---|---|
| AUTH_USERID1 | userId1, one-way hash(encryption key + userId1 + user1's timestamp) | USERSESSION_USERID1 | userId1, language, currency, [storeId A, . . . ], [storeId B, . . . ], one-way hash(encryption key + value part of this cookie) |
| AUTH_USERID2 | userId2, one-way hash(encryption key + userId2 + user2's timestamp) | USERSESSION_USERID2 | userId2, language, currency, [storeId Y, . . . ], one-way hash(encryption key + value part of this cookie) |
| . . . | . . . | . . . | . . . |
| AUTH_USERIDn | userIdn, one-way hash(encryption key + userIdn + usern's timestamp) | USERSESSION_USERIDn | userIdn, language, currency, [storeId Z, . . . ], one-way hash(encryption key + value part of this cookie) |

Cookie values may be encoded to ensure they comply with any restricted character set requirements as will be understood by persons of ordinary skill in the art.

Processing a Request

Figure 4:
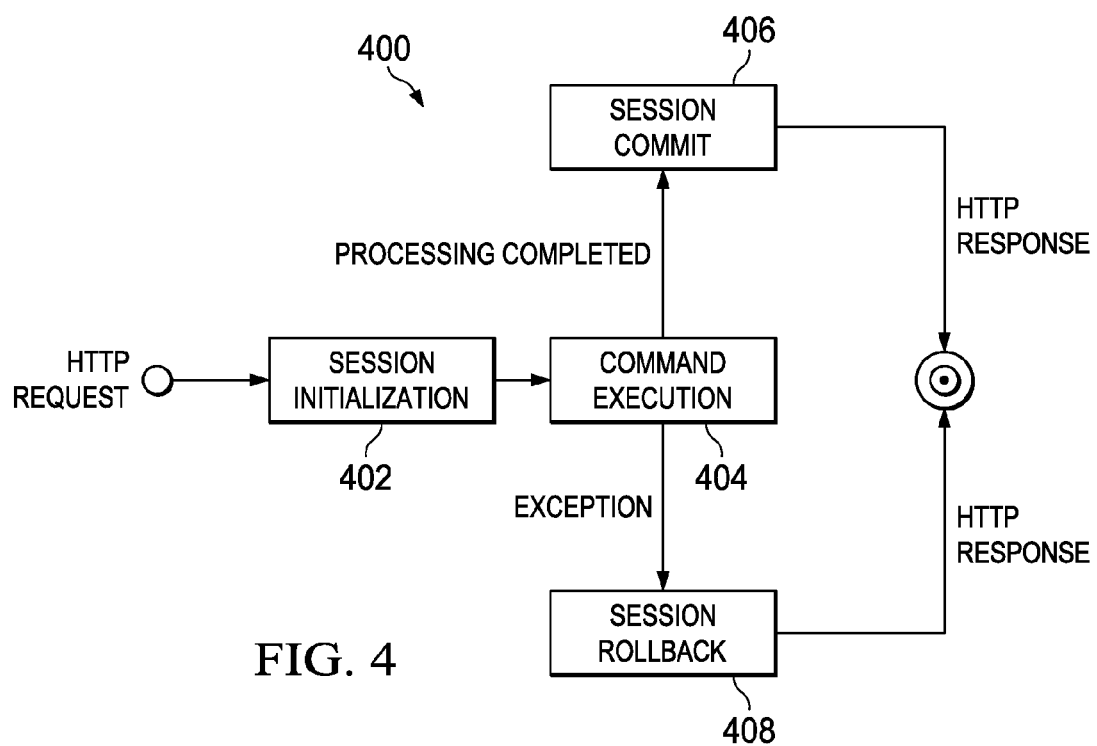
FIG. 4 illustrates a further state diagram modeling an aspect of the present invention shown in FIG. 2.

FIG. 4 is a state diagram that illustrates states and transitions 400 showing how an e-commerce operation request is processed in a security domain in accordance with the exemplary embodiment of the invention by EAS 206. Further details of the operation of EAS 206 and manager 208 are illustrated in FIG. 5. With reference to FIG. 4, the operation on EAS 206 invoked by a user request can be broken down in to several parts.

i) Session Initialization (State 402) determines what user ID will be used during processing of the request.
ii) Command Execution (State 404) comprises the processing of the business process logic for the e-commerce site, which processing may result in a change to the user ID, the user session information or both.
iii) Session Commit (State 406) is responsible for persisting any changes in the authentication information or user session information to the client browser.
iv) Session Rollback (State 408) unwinds any changes that were made during command execution if an exception occurs, resulting in the request processing being aborted.

Session initialization (State 402) commences upon receipt of an HTTP request from the client browser. An HTTP response results from either of Session Commit (State 406) or Session Rollback (State 408) and may be written to a response buffer (not shown) of memory 200 for communicating to the client browser.

In accordance with an aspect of the invention, FIG. 5 illustrates method steps 500 of EAS 206 including manager 208, highlighting operations at various stages of successful request processing. With reference to FIG. 4, steps 502-518 generally illustrate the activities that occur during session initialization (Stage 402); step 520 represents command execution (Stage 404); and steps 522-530 illustrate a session commit (Stage 408). With reference in greater detail to FIG. 5, request processing that occurs when an operation is invoked in a security domain defined by EAS 206 and manger 208 is further described.

When an HTTP request arrives at EAS 206 from a client browser (step 502), all the cookies in the request are parsed from its header. The authentication cookie and its associated user session cookie are paired together to define a single session element. The session elements are strung together in a list.

The current security domain is determined from information specified in the URL of the HTTP request (step 502). At Step 506, the session list is iterated to determine if there is a session that already exists for the security domain or if not then does a user from an existing session play a role in the current security domain. If a session does exist, processing continues at step 516.

At step 508, a determination is made whether the command being executed is a generic command and processing continues at step 510 if it is generic and otherwise proceeds to step 514. At step 510, the user ID is set to the generic user and at step 512 the user ID and other session information is made available to the business logic during its execution.

At alternate step 514, a new guest user is created before execution of step 512. At alternate step 516, as it has been determined that there is an existing session for the domain, the authentication cookie is verified and the user session information is deserialized from the session cookie. At step 518, if the user ID is a generic type then processing continues at step 508 as previously described. Otherwise, processing continues at step 512 using the information retrieved from the cookies.

From step 512, processing continues at step 520 where the business logic is executed. As described above with reference to FIG. 4, the business logic may change the user ID or the other session information.

As such, at step 522, changes done during the business logic execution are made available to the session commit. At step 524 a determination is made whether the user ID was changed in any of the previous steps. If the user ID did not change in the session, processing may end (step 526); otherwise, the user ID changed in the session and at step 528, a determination is made as to whether there was a previous session for the current security domain.

If there was no previous user ID associated with this security domain, manager 208 creates and persists a new session for the user ID associated with the current security domain (step 530). If a previous session does exist, it is first deleted (step 532) before executing step 530 to clean up the previous session.

Operation of EAS 206 and manager 208 may be further understood by way of an exemplary user shopping scenario. In accordance with this example, EAS 206 defines exemplary e-commerce shopping mall site 120 as illustrated by FIG. 1B providing stores A and B (122, 124) each defined within respective security domains. In further accordance with this example, a user has previously registered to stores A and B (122, 124) under different user IDs, namely user ID α in store A 122 and user ID β in store B 124. This exemplary user shopping scenario describes operation of manager 208 and the cookies it generates while the user 1) shops at store A 122 as a generic user; 2) logs in as user ID α; 3) adds an item to a shopping cart as user ID α; 4) proceeds to store B 124 as a guest; and 5) logs in to store B 124 as user ID β; and 6) logs off store B 124.

| | | | |
|---|---|---|---|
| 1) | User Operation: | User opens a client browser and accesses store A at a URL, e.g. shop.ibm.com/... StoreFront?storeId = A&langId = En&curId = US. | |
| | Manager Operation: | Session Initialization: Determines there is no current user ID for store A. Sets User ID to Generic User; Command Execution: performs request processing; Session Commit: creates and assigns to client browser the AUTH_genericUserId and USERSESSION_genericUserId cookies: | |

| Authentication Cookie Name | Authentication Cookie Value | Store Session Cookie Name | Store Session Cookie Value |
|---|---|---|---|
| AUTH_genericUserId | genericUserId, one-way hash( encryption key + genericUserId + genericUserId's timestamp) | USERSESSION_genericUserId | genericUserId, English, US dollars, [storeId A, ... ], one-way hash(encryption key + value part of this cookie) |

| | | | |
|---|---|---|---|
| 2) | User Operation: | User logins to store A as user ID α. | |
| | Manager Operation: | Session Initialization: UserId for store A from session is currently genericUserId; Command Execution: business logic processing results in change of userId; Session Commit: The AUTH_α and USERSESSION_α cookies below are written to the response buffer for assigning to the client browser. The AUTH_genericUserId and USERSESSION_genericUserId cookies are deleted. | |

| Authentication Cookie Name | Authentication Cookie Value | Store Session Cookie Name | Store Session Cookie Value |
|---|---|---|---|
| AUTH_α | α, one-way hash( encryption key + α + α's timestamp) | USERSESSION_α | α, Spanish, US dollars, [storeId A, ... ], one-way hash(encryption key + value part of this cookie) |

| | | | |
|---|---|---|---|
| 3) | User Operation: | User adds items to a shopping cart of Store A. | |
| | Manager Operation: | Session Initialization: Current User ID for store A from session data is α; Command Execution: Request processing; Session Commit: No changes to cookies. | |
| 4) | User Operation: | User navigates to store B's page which requires a guest user ID: e.g. shop.ibm.com/... StoreFront?storeId=B&langId=En&curId=US | |
| | Manager Operation: | Session Initialization: Cannot reuse the userId already in the session, thus creates a guest user (e.g. user ID 123); Command Execution: Request processing; Session Commit: Cookies updated: | |

| Authentication Cookie Name | Authentication Cookie Value | Store Session Cookie Name | Store Session Cookie Value |
|---|---|---|---|
| AUTH_α | α, one-way hash( encryption key + α + α's timestamp) | USERSESSION_α | α, Spanish, US dollars, [storeId A, ... ], one-way hash(encryption key + value part of this cookie) |
| AUTH_123 | 123, one-way hash( encryption key + 123 + 123's | USERSESSION_123 | 123, English, US dollars, [storeId B, ... ], one-way |

-continued

| | | | |
|---|---|---|---|
| | timestamp) | | hash(encryption key + value part of this cookie) |
| 5) | User Operation:<br>Manager Operation: | User logons to store B as β.<br>Session Initialization: The User ID for store B from this session is currently 123; Command Execution: ... business logic processing results in change of identity to β; Session Commit: AUTH_β and USERSESSION_β cookies are written to the response buffer and AUTH_123 and USERSESSION_123 cookies are deleted from the client browser. | |
| Authentication Cookie Name | Authentication Cookie Value | Store Session Cookie Name | Store Session Cookie Value |
| AUTH_α | α,<br>one-way hash(<br>encryption key +<br>α + α's<br>timestamp) | USERSESSION_α | α,<br>Spanish, US dollars,<br>[storeId A, ... ],<br>one-way<br>hash(encryption key + value part of this cookie) |
| AUTH_β | β,<br>one-way hash(<br>encryption key +<br>β + β's<br>timestamp) | USERSESSION_β | β,<br>French, US dollars,<br>[storeId B, ... ],<br>one-way<br>hash(encryption key + value part of this cookie) |
| 6) | User Operation:<br>Manager Operation: | User logs off store B.<br>Session Initialization: Identity for store B from session data is β; Command Execution: Request processing results in logoff; Session Commit: The AUTH_β and USERSESSION_β cookies are deleted on the client browser, for example, by having manager write these cookies to the response buffer and setting the cookie age to zero. Also, the value is set as DEL. | |
| Authentication Cookie Name | Authentication Cookie Value | Store Session Cookie Name | Store Session Cookie Value |
| AUTH_α | α,<br>one-way hash(<br>encryption key +<br>α + α's<br>timestamp) | USERSESSION_α | α,<br>Spanish, US dollars,<br>[storeId A, ... ],<br>one-way<br>hash(encryption key + value part of this cookie) |

As will be appreciated by those skilled in the art, modifications to the above-described embodiment can be made without departing from the essence of the invention. For example, persons of ordinary skill in the art will appreciate that the generic user type may be adopted for reasons of scalability. Generic users require fewer resources and these may be reused. UserIDs and associated types are persisted by the e-commerce site, for example, by storing to an information retrieval system such as a database table. In the exemplary embodiment, the table stores the user ID along with its type, using R to indicate registered userIDs and using G to represent guest user IDs. However, the generic user ID is hard coded to a specific number.

While one (or more) embodiment(s) of this invention has been illustrated in the accompanying drawings and described above, it will be evident to those skilled in the art that changes and modifications may be made therein without departing from the essence of this invention. All such modifications or variations are believed to be within the sphere and scope of the invention as defined by the claims appended hereto. Other modifications will be apparent to those skilled in the art and, therefore, the invention is defined in the claims.

The embodiments of the invention in which an exclusive property or privilege is claimed are defined as follows:

1. A method for managing multiple user identities for a user of an electronic commerce (e-commerce) site, the method comprising:

defining the e-commerce site as a plurality of security domains; and in response to a user's request to invoke an operation of the e-commerce site:

identifying a type of user identity being used by the user, wherein types of user identities comprise a guest identity, a generic identity, and a registered identity, wherein the generic identity is a single user identity shared throughout a security domain, wherein the guest identity is an unique temporary user identity assigned to a user for the life of the user's session within the security domain, and wherein the registered identity is an unique identity that is reusable across sessions within the security domain;

determining if the type of user identity is appropriate to invoke the operation;

responsive to the type of user identity being an inappropriate type of user identity to invoke the operation, switching the user to the appropriate type of user identity to invoke the operation;

responsive to the type of user identity being appropriate to invoke the operation, determining a security domain of the plurality of security domains to which the operation relates;

selecting a session from a plurality of sessions persisted for the user based on the determined security domain; and reusing the selected session for the user automatically in accordance with the determined security domain, the selected session being associated with a user identity and a role, the user identity and the role together indicating privileges for invoking operations of the e-commerce site in the determined security domain.

2. The method of claim 1 comprising invoking the requested operation with the user identity and the role of the selected session.

3. The method of claim 2 wherein the selected session comprises information indicating at least one of: the user preference's for invoking operations at the e-commerce site; the user's preferences for invoking operations at least for the determined security domain; and a security signature for authenticating the selected session information.

4. The method of claim 1 comprising evaluating the requested operation to determine an operation type and wherein the step of reusing is performed in accordance with the operation type.

5. The method of claim 4 wherein the user identity is associated with an identity type for permitting the invocation of operations; wherein the method comprises receiving the user's request in association with the plurality of sessions persisted for the user and retrieving the user identity for the determined security domain from the plurality of sessions; and wherein the step of reusing is performed in response to the identity type of the retrieved user identity.

6. The method of claim 1 wherein the step of selecting comprises providing one or more cookies defining the selected session to the user for associating with a subsequent request.

7. The method of claim 6 wherein the cookies comprise an authentication cookie and a session cookie; and wherein the method comprises authenticating the user's request.

8. The method of claim 1 comprising:

defining each of the plurality of security domains as a hierarchy of organizations and assets owned by the organizations; and wherein the step of determining the security domain of the plurality of security domains to which the operation relates comprises evaluating the user's request in accordance with the hierarchy.

9. The method of claim 1, further comprising:

responsive to the user ending an operation of the e-commerce site, switching the user back to the inappropriate type of user identity.

* * * * *